Patented May 15, 1945

2,376,130

UNITED STATES PATENT OFFICE 2,376,130

SUBSTITUTED NAPHTHENYL HYDROXY METHANE PHOSPHONIC ACIDS

Joseph B. Dickey and James G. McNally, Rochester, N. Y., assignors to Eastman Kodak Company, Rochester, N. Y., a corporation of New Jersey No Drawing. Application June 5, 1943, Serial No. 489,810

1 Claim. (Cl. 260—500)

This invention relates to the preparation and use of a new class of chemical compounds which are particularly useful as surface-active agents, anti-static agents, dispersing agents, textile assistants and for other purposes and more particularly to the preparation of substituted naphthenyl hydroxy methane phosphonic acids.

The preparation of the broad class of chemical compounds into which the specific compounds of our invention fall is described in detail in U. S. patent to Stevens and Turner No. 2,254,124 and in the U. S. patent to Dickey and McNally 2,286,-792. The preparation of the particular class of compounds constituting the subject matter of the instant invention is not, however, to the best of our knowledge and belief, disclosed in the Stevens and Turner patent, nor any other disclosures of the prior art embodying the work of others.

It is an object of our invention to prepare a hitherto unknown class of derivatives of naphthenyl hydroxy methane phosphonic acids. A further object is to prepare substituted naphthenyl hydroxy methane phosphonic acids in which the substituent is a radical such as naphthenyl, alkyl or phenyl. A still further object is to provide substituted naphthenyl hydroxy methane phosphonic acids of especial value as anti-static agents for the treatment of cellulose acetate yarns and other textile materials and for other purposes involving surface-active phenomena. Other objects will appear hereinafter.

These compounds may be prepared by reacting the desired naphthenyl ketone with phosphorus trichloride, followed by treatment with acetic acid and water. The broad method of preparation follows that set forth in the above-mentioned patents and is thus not novel as a method. The preparation of the specific compounds constituting our invention will be set forth in detail by the illustrative examples below.

Our novel compounds may, as indicated above, be regarded as substituted naphthenyl hydroxy methane phosphonic acids which have the following structural formula:

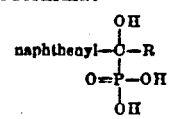

wherein R is a hydrocarbon radical selected from the group consisting of naphthenyl and alkyl. By the term "alkyl" we refer to hydrocarbon radicals of the formula $C_nH_{2n+1}$ typified by methyl, ethyl, propyl, butyl and so on up to $C_{17}H_{35}$. By the term "phenyl" we refer to the phenyl group, as such, or an alkyl-substituted phenyl group, such as the various xylenes, trimethylbenzene, diethylbenzene, tri-isopropylbenzine, di-secondary butylbenzene, cyclohexylbenzene, cetylbenzene and the like.

The nature of the compounds included within the scope of our invention will be more readily apparent from a consideration of the following examples of preparation of typical compounds, which examples are included merely for purposes of illustration and not as a limitation of our invention.

*Example 1.—Naphthenyl phenyl hydroxy methane phosphonic acid*

One mol of phenyl naphthenyl ketone is added with stirring to 160 grams phosphorus trichloride at 35° C. over a period of three hours. The reaction mixture is warmed to 60–70° for eight hours and then, after cooling to about 20° C., 600 cc. acetic acid is added at such a rate that the temperature remains between 20 to 30° C. The reaction mixture is allowed to stand at room temperature for twelve hours, whereupon the acetyl chloride formed in the reaction and the unchanged acetic acid is removed by distillation under reduced pressure. The residue is then poured onto 600 grams of ice or into 600 grams of water, whereupon the mixture separates into two layers, one of which is a heavy, viscous, colorless oil, which is the desired product, which is decanted and washed free of mineral acid and dried by warming on a steam bath under reduced pressure.

The product is a heavy, colorless oil which, due to the varied nature of the starting materials used in preparing the original compound acted upon, has no determinable melting or boiling point and is not susceptible of distillation because of the fact that decomposition takes place. This characteristic is true of all the compounds, the preparation of which will be described below. However, it may be said that the product is only slightly soluble in water, but readily soluble in solvents such as acetic acid, alcohol, benzene and the like. The product has a comparatively strong mono-basic reaction and a weak di-basic action. The product is designated naphthenyl phenyl hydroxy methane phosphonate and has the following graphic formula:

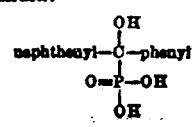

Example 2.—Naphthenyl methyl hydroxy methane phosphonic acid

One mol of methyl naphthenyl ketone is added with stirring to 160 grams phosphorus trichloride at a temperature of 35° C. over a period of three hours. The reaction mixture is warmed to 60–70° C. for eight hours and then, after cooling to 20° C. 600 cc. of acetic acid is added at such a rate that the temperature remains between 20 and 30° C. The reaction mixture is allowed to stand at room temperature for twelve hours and, after removal of the acetyl chloride formed in the reaction and the unreacted acetic acid by distillation under reduced pressure, is poured into 500 cc. of cold water, washed by decantation and dried as described in Example 1. Its physical and chemical properties and solubilities are substantially the same as the product described in Example 1. The compound is naphthenyl methyl hydroxy methane phosphonic acid having the graphic formula

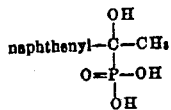

Example 3.—Naphthenyl butyl hydroxy methane phosphonic acid

One mol of butyl naphthenyl ketone is added with stirring to 160 grams phosphorus trichloride at 35° over a period of three hours. The reaction mixture is warmed to 60–70° for eight hours and after cooling to 20°, 600 cc. acetic acid is added at a rate keeping the temperature at 20–30°. The reaction mixture is treated substantially as described in Examples 1 and 2 for removal of the acetyl chloride and unchanged acetic acid, after which it is poured into 500 cc. cold water, washed by decantation and dried. The physical and chemical properties and solubilities are the same as those of the product of Example 1. The compound is naphthenyl butyl hydroxy methane phosphonic acid having the graphic formula

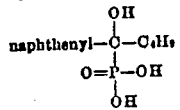

Example 4.—Naphthenyl (mixed) xylyl hydroxy methane phosphonic acid 170 g. of phosphorus trichloride is added with stirring to 300 g. of naphthenyl xylyl ketone heated to 60°. Heating and stirring are continued at 60–70° for 8 hours. The reaction mixture is allowed to stand at room temperature for 12 hours and then 240 g. of acetic acid is added. The mixture is heated with stirring at 60–70° for eight hours and the acetyl chloride and excess acetic acid are removed by distillation. The mixture is then poured into water, washed free of mineral acids, decanted and found to be a heavy, viscous, colorless oil of undeterminable melting point and insusceptible of distillation because of decomposition. The material is naphthenyl (mixed) xylyl hydroxy methane phosphonic acid having the graphic formula:

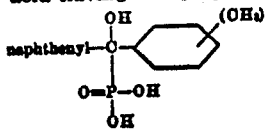

Example 5.—Dinaphthenyl hydroxy methane phosphonic acid 170 g. of phosphorus trichloride is added with stirring to 300 g. of dinaphthenyl ketone heated to 60°. After heating at 60–70° for eight hours the reaction mixture is allowed to stand at room temperature for twelve hours. Then 240 g. of acetic acid is added and the mixture is heated at 60–70° for 8 hours. The acetyl chloride and excess acetic acid are removed as described in the preceding examples, the product is poured into water, washed, decanted and found to be a heavy, viscous oil possessing the same physical, chemical and solubility properties as the products previously described. The product is dinaphthenyl hydroxy methane phosphonic acid having the graphic formula:

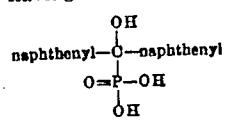

Example 6.—Naphthenyl (mixed) tri-iso-propyl phenyl hydroxy methane phosphonic acid 170 g. phosphorus trichloride is added with stirring to mixed naphthenyl tri-iso-propyl phenyl ketone (325 g.) heated to 60°. Heating and stirring are continued at 60–70° for 8 hours. The reaction mixture is treated substantially as in the previous examples. The product has the same physical, chemical and solubility properties as the products of the previous examples. It may be designated naphthenyl (mixed) tri-iso-propyl phenyl hydroxy methane phosphonic acid and has the graphic formula:

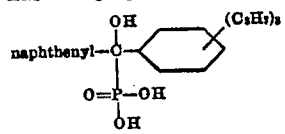

The starting materials employed for the preparation of the various substituted naphthenyl hydroxy methane phosphonic acids as referred to in the above examples may be prepared as follows:

Phenyl naphthenyl ketone (Example 1) may be prepared by reacting 300 grams of benzene, 67 grams of aluminum chloride and 73 grams of naphthenic acid chloride on a steam bath with stirring for 10 hours or until no more hydrogen chloride is evolved. When the reaction has cooled, it is poured onto ice, separated and washed first with 5% hydrochloric acid, and then with water and finally distilled. An excellent yield of phenyl naphthenyl ketone which is a heavy, colorless liquid boiling within the range of 125–300° C. under a pressure of 1 mm., is obtained.

Methyl naphthenyl ketone (Example 2) may be prepared by the procedure described in Examples 1 and 2 of U. S. Patent 1,989,325.

Butyl naphthenyl ketone (Example 3) may be prepared by the same general procedure as outlined in Examples 1 and 2 of U. S. Patent 1,989,325, except that in this case valeric acid is employed in place of the acetic acid of the patent.

Naphthenyl xylyl ketone (Example 4) may be prepared by the same procedure as indicated above for the preparation of phenyl naphthenyl ketone, except that mixed xylenes (a mixture of ortho-, meta-, and para-xylenes) are employed in place of benzene. In this case, the mixed xylyl naphthenyl ketone boils within a range of 130–135° C. at 2 mm. pressure.

Dinaphthenyl ketone (Example 5) may be prepared by the following procedure: 400 grams of naphthenic acid (N. E. 240) and 40 grams iron filings are placed in a reaction vessel and slowly heated to 250° C. Carbon dioxide begins to evolve at this temperature and heating is continued until no more gas is evolved. The iron sludge is then separated and the dark-colored produce distilled under reduced pressure after extraction with alkali. A colorless, viscous distillate boiling at 130–200° C. at 1 mm. pressure is obtained. The yield is approximately 50%.

The mixed naphthenyl tri-isopropyl phenyl ketone may be prepared exactly as outlined for the preparation of phenyl naphthenyl ketone described above, except that the mixed tri-isopropyl benzene is employed in place of benzene.

In addition to the specific compounds, the preparation of which is disclosed in the above illustrative examples, a large number of other compounds falling within the scope of the compounds of our invention may be prepared by employing other ketones as the starting material. For example, ketones such as naphthenyl palmityl ketone, naphthenyl stearyl ketone, naphthenyl oleyl ketone, naphthenyl amyl ketone, naphthenyl (mixed) di-secondary butyl ketone, naphthenyl phenyl cetyl ketone, naphthenyl (mixed) tri-ethyl phenyl ketone and many others may be employed as the starting material for the production of the substituted naphthenyl hydroxy methane phosphonic acids of our invention.

Both the starting materials and the compounds of our invention are naphthenyl derivatives. By the term "naphthenyl" we mean radicals of the general class described in Chapter 48 of "The Chemistry of Petroleum Derivatives" by Carlton Ellis.

We have found that the substituted naphthenyl compounds of our invention have a wide range of usefulness as surface-active agents. We have found that they are particularly efficacious when used as anti-static agents in the treatment of cellulose acetate and other cellulose derivative yarns because of their solubility in petroleum ether and in various mineral, vegetable and animal oils, customarily employed in the treatment of textile yarns. They are also valuable as dispersing agents, textile assistants and for various other purposes in the washing, dyeing, lubricating and other treatment of textile materials.

What we claim is:

As new chemical compounds naphthenyl hydroxy methane phosphonic acids having the structural formula

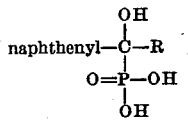

wherein R is a hydrocarbon radical selected from the group consisting of naphthenyl and alkyl.

JOSEPH B. DICKEY.
JAMES G. McNALLY.